Jan. 2, 1934.  G. EICHENBERG ET AL  1,941,545
PROCESS FOR REDUCING THE DUST LOSSES FROM SHAFT FURNACES
Filed March 7, 1930   2 Sheets-Sheet 1

Inventors:
G. Eichenberg
H. Wark

By Marks & Clerk
Attys.

Jan. 2, 1934. G. EICHENBERG ET AL 1,941,545
PROCESS FOR REDUCING THE DUST LOSSES FROM SHAFT FURNACES
Filed March 7, 1930 2 Sheets-Sheet 2
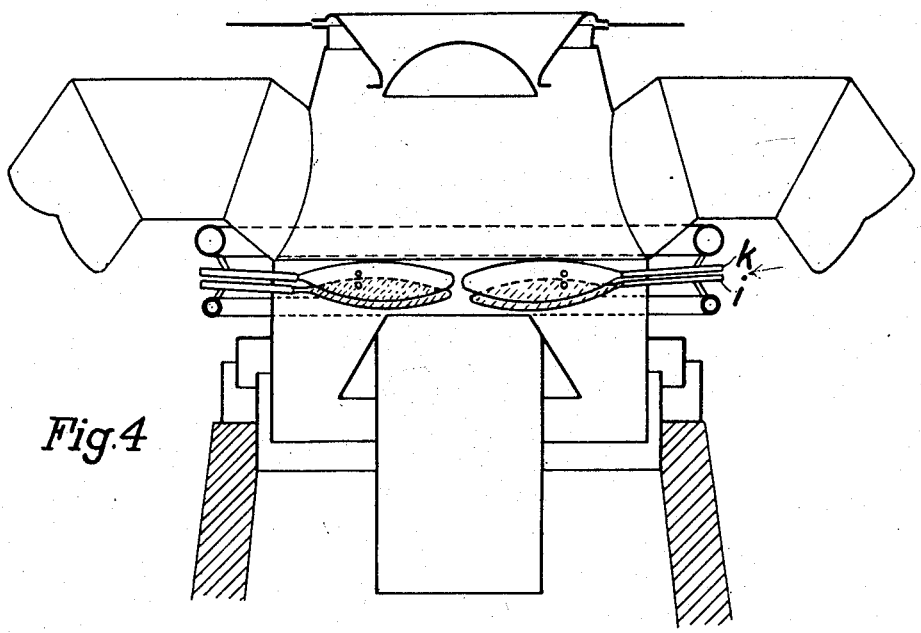
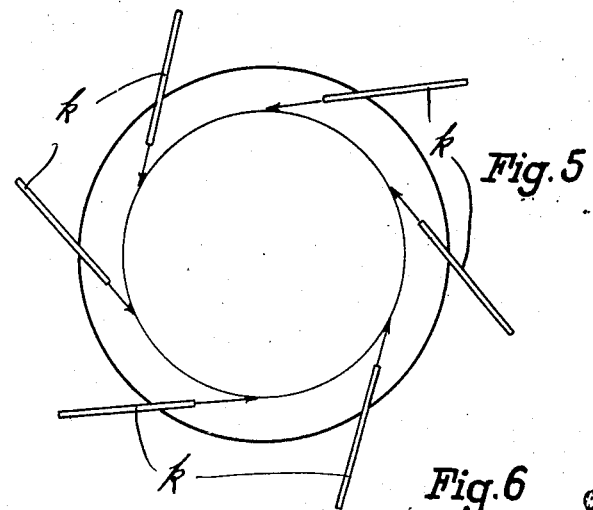
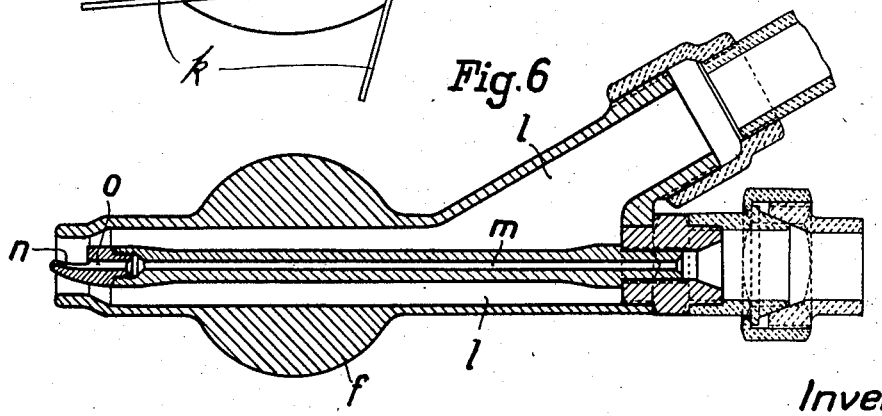
Inventor:
G. Eichenberg
n. Wark Patented Jan. 2, 1934

1,941,545

UNITED STATES PATENT OFFICE 1,941,545

PROCESS FOR REDUCING THE DUST LOSSES FROM SHAFT FURNACES

Georg Eichenberg and Nikolaus Wark, Crefeld-Rheinhafen, Germany

Application March 7, 1930, Serial No. 434,081, and in Germany September 14, 1929

11 Claims. (Cl. 266—31)

In the rationalization of the shaft furnace industry and in particular of the blast furnace industry, recourse has been had to more intensive working of the various furnace elements, at a cost of the disadvantage, hitherto unavoidable, of greatly increased furnace throat dust losses which accompany the higher blast loading. These losses in dust vary, for example, in blast furnaces between 10% and 35% of the output of raw iron, according to the nature of the ore being smelted.

In the hitherto known plants the furnace throat dust is led out of the shaft furnace with the gases and precipitated by special gas purifying processes outside the melting furnace itself. In this way large quantities of valuable ore, added material and coke are withdrawn from the melting operation and either completely lost or rendered usable again only by expensive briquetting or agglomerating processes. In addition the furnace throat dust losses undesirably effect the efficiency of utilization of the fuel.

According to the invention the above stated disadvantages are avoided by acting on the gas drawn off from shaft furnaces, immediately it has left the charge but within the furnace throat and below the closure thereof, with forced streams (currents). The forced-stream supply takes place through spraying nozzles within the furnace throat and below the closure thereof, being effected particularly over the cross section of the outlets but also over the whole throat cross section. The inclination of the spraying nozzles may vary as desired. There is thus produced an impact and a change in direction and speed of the furnace gases and thereby a deposition of the throat dust. The forced stream supply for effecting this deposition of throat dust may consist of air, purified gases, or vapours under pressure, which may be used alone or together with water under pressure, which is divided and dispersed by suitable nozzles. It is also possible to use the water under pressure alone for this purpose, because the water may act as a forced stream, if it is divided and dispersed by suitable nozzles.

If water under pressure is used alone to effect the above described action, the water must perform the work of the gases, vapours or air under pressure; that is, as well as effecting the dust deposition, it must also produce the eddying and changes in direction and speed of the rising gas current. This is possible if the water stream under pressure is fed with the proper degree of force and the separate particles of spray given a high kinetic energy. This kinetic energy ($\frac{1}{2} mv^2$) depends on the total mass $m$ of the drops of water and the velocity $v$ at which the water leaves the nozzle. The correct values are obtained by the distribution effected by the nozzles and by adjustment of the water pressure. For this purpose the water must be supplied under a pressure difference of at least 1 atmosphere, measured at the nozzle.

In the above described manner the furnace throat dust carried in the rising gas current is deposited as soon as the gases leave the charge column but while they are still in the throat and below the charging opening and falls freely onto the sinking charge to be carried into the melting process.

In the accompanying drawings, Figure 1 shows, by way of example, an apparatus embodying the invention.

Figure 4 is a view similar to Figure 1 showing a modification of the invention.

Figure 5 is a diagrammatic section on the line II—II of Figure 4.

Figure 6 is a detail section through a further modified form of nozzle.

According to the invention, nozzles $b$ are built into the offtake passage $a$, through which nozzles, purified gases, vapours or air under pressure are injected. Simultaneously water under pressure is supplied (added), and divided and dispersed by the purified gases or vapours.

By the special arrangement of injecting nozzles seen in Figures 1 and 2, the forced current, encountering the furnace gas passing off, produces a change in the direction and speed of the latter and produces eddying and impact therewith so that precipitation of the dust particles takes place inside the furnace throat and below the charging opening.

It has already been mentioned that water under pressure is advantageously supplied simultaneously with the gas, vapour or air stream and is preferably divided and dispersed by the gas, vapour or air, so that a spray is formed. By this means the deposition of dust from the rising gas current is facilitated, since the dust particles, as is well known, are bound by the drops of water and fall.

Figure 1:
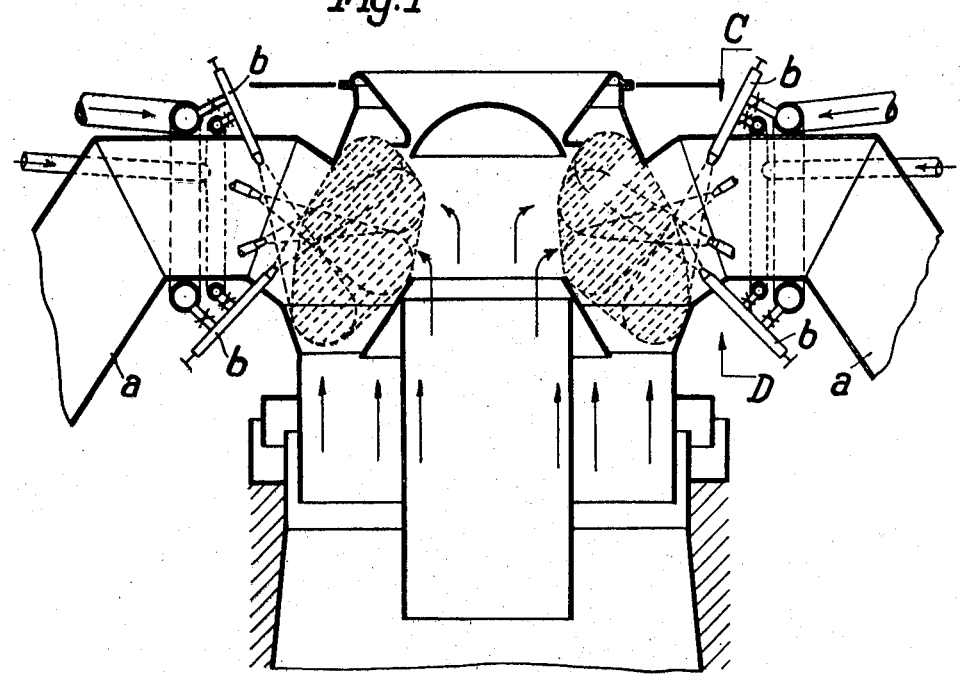
Figure 2:
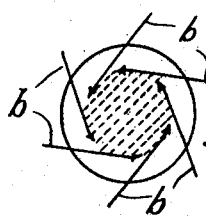
Figure 2 is a diagrammatic section on the line C—D of Figure 1, the nozzle directions and gas eddying being diagrammatically indicated.
Figure 3:
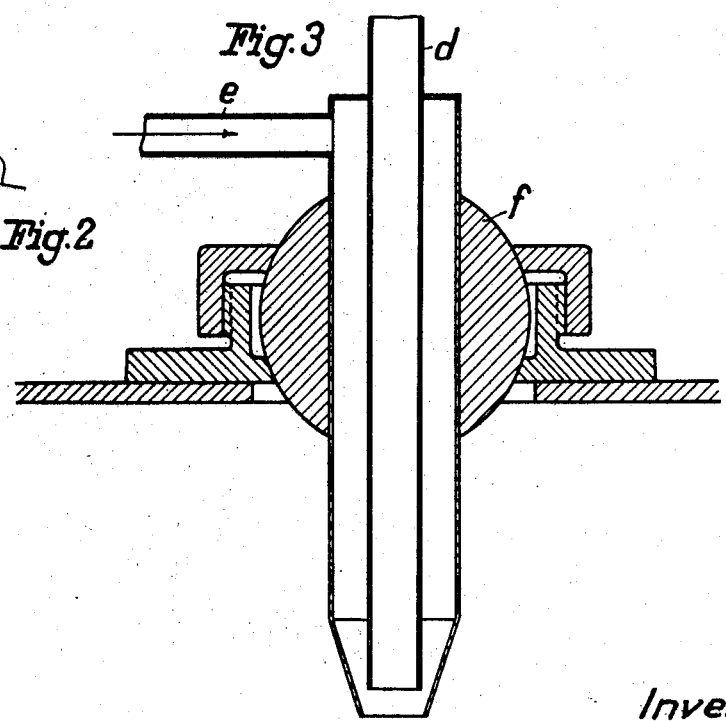
Figure 3 shows an example of injecting nozzle with adjusting means, for the simultaneous supply of gas and water.

The injection nozzles must be so arranged, as may be seen more particularly in Figure 1, that the cross sections of all the outlets and also the cross section of the whole furnace are, as it were, shut off by a water irrigated pressure cushion, the cushion being adapted to be regulated by adjustment of the movable injection nozzles, so that its action may suit the operating conditions. These nozzles b, as shown in Figure 3, consist of a double tube, the inner tube d serving to conduct, for example, a stream of gas and the outer tube e a current of water under pressure, the complete nozzle being mounted for adjustment in any desired direction according to the operating conditions by a spherical member f.

It is, however, not necessary to supply the different mediums simultaneously in this manner; on the contrary the individual gaseous mediums, and in this case advantageously the forced current of water, can be supplied by separate nozzles, while the division and distribution of the water under pressure is effected by the particular formation of the nozzle. With this separation of the nozzles it is possible to arrange the entry of the separate mediums in any desired way in the furnace, that is the nozzles for the gas currents can be above or beside those for the water currents. The gas should, however, always direct the spray of water formed.

Recognition that this separate supply is possible is essential for it renders possible a further embodiment. If the gas be supplied intermittently, the impact effect can be increased with this pulsation of the gas current, and equally so with varying gas pressure. Most important, however, is that with this measure the spray of water will continuously change its position in the furnace owing to the varying gas speeds, that is, the spray of water is continually varied as it is led in.

Particular consideration of the supply of the gas currents is of special importance, because it has been found that not only the deposition of dust but also an improvement in the so-called marginal current effect and the operation of the furnace, can be effected by the aid of the process. With the use of the method, particularly when the nozzles are provided over the whole circumference of the furnace throat, which preferably direct the forced current tangentially into the throat space, the advantage is obtained that owing to the eddying produced the charge sinks more easily, the output rises and the coke consumption falls.

Figure 4 shows a furnace throat in section in which injection nozzles are provided in particular on the circumference, which supply forced currents, gas and water in a tangential direction, an embodiment being shown by way of example in which the water and gas, vapour or air, under pressure, are fed in separately.

The water is supplied through nozzles i while the gas, vapour or air is supplied through nozzles k. The angles of the nozzles can each be varied according to the prevailing conditions, this being made possible by rotatably mounting the nozzles by the aid of a spherical formation f.

The embodiment shown in Figure 6 has a lead l for a gas or vapour current and a tube m for the water current which in this construction is not atomized by the current driven through lead l but by the spoon like formation of the member n on the mouth-piece o of the water tube.

What we claim is:

1. A process for reducing dust losses in shaft furnaces, which comprises treating the furnace gases in advance of their exit from a space above the charge in the furnace by means of such fluid currents, inwardly directed, that entrained solid matter carried by the furnace gases is deposited directly upon the charge in the furnace.

2. A process for reducing dust losses in shaft furnaces, which comprises treating the furnace gases in advance of their exit from a space above the charge in the furnace by means of fluid currents covering substantially the entire cross sectional area of the furnace, such currents changing the velocity and direction of the furnace gases in such manner that entrained solid matter carried by the furnace gases is deposited directly upon the charge in the furnace.

3. A process for reducing dust losses in shaft furnaces, which comprises treating the furnace gases in advance of their exit from a space above the charge in the furnace by means of fluid currents directed tangentially inwardly from adjacent the periphery of the furnace, such currents reducing the vertical velocity and giving a swirling movement to the furnace gases so that entrained solid matter carried by the furnace gases is deposited directly upon the charge in the furnace.

4. A process for reducing dust losses in shaft furnaces, which comprises treating the furnace gases in advance of their exit from a space above the charge in the furnace by means of fluid currents comprising gas and water under pressure, such currents and the impact of water reducing the vertical velocity and giving a swirling movement to the furnace gases so that entrained solid matter carried by the furnace gases is deposited directly upon the charge in the furnace.

5. A process for reducing dust losses in shaft furnaces, which comprises treating the furnace gases and their entrained solid matter within the furnace and above the charge therein by means spraying water into said furnace, said spraying moistening the solid matter and the impact of the water causing a change in direction of flow of the gases and a deposition of the solid matter directly upon the charge in the furnace.

6. A process for reducing dust losses in shaft furnaces, which comprises treating the furnace gases and their entrained solid matter within the furnace and above the charge therein by means spraying water tangentially into said furnace, said spraying moistening the solid matter and the impact of the water causing a swirling circular flow of the gases and a deposition of the solid matter directly upon the charge in the furnace.

7. A process for reducing the dust losses in shaft furnaces, which comprises treating the furnace gases and their entrained solid matter within the furnace and above the charge therein by intermittently injecting a flow of fluid under pressure into the gases and changing their direction and velocity so that entrained solids are deposited directly upon the charge in the furnace.

8. A process for reducing the dust losses in shaft furnaces, which comprises treating the furnace gases and their entrained solid matter within the furnace and above the charge therein by intermittently injecting a flow of fluid under pressure tangentially from adjacent the periphery of the furnace into the gases and changing their direction and velocity so that entrained solids are deposited directly upon the charge in the furnace.

9. In combination with a shaft furnace having gas discharge passages leading from the upper portion thereof, spray nozzles extending tangentially inward of the furnace adjacent the discharge passages adapted to discharge a whirling fluid spray covering substantially the entire passage area between the furnace and discharge passages.

10. In combination with a shaft furnace having gas discharge passages leading from the upper portion thereof, separate nozzles extending into the upper portion of the furnace adjacent the discharge passages and adapted to discharge gas and liquid sprays covering substantially the entire passage area between the furnace and discharge passages.

11. In combination with a shaft furnace having gas discharge passages leading from the upper portion thereof, a series of circumferentially placed adjustable nozzles adapted to be directed tangentially of the furnace to cover the furnace cross sectional area with a whirling spray.

GEORG EICHENBERG.
NIKOLAUS WARK.